(12) United States Patent
Srinivasachar (10) Patent No.: US 7,722,843 B1
(45) Date of Patent: May 25, 2010

(54) SYSTEM AND METHOD FOR SEQUESTRATION AND SEPARATION OF MERCURY IN COMBUSTION EXHAUST GAS AQUEOUS SCRUBBER SYSTEMS

(76) Inventor: Srivats Srinivasachar, 10 Podunk Rd., Sturbridge, MA (US) 01566

( * ) Notice: Subject to any disclaimer, the term of this patent is extended or adjusted under 35 U.S.C. 154(b) by 116 days.

(21) Appl. No.: 11/944,705

(22) Filed: Nov. 26, 2007

Related U.S. Application Data (60) Provisional application No. 60/860,891, filed on Nov. 24, 2006.

(51) Int. Cl.
- *B01D 53/50* (2006.01)
- *B01D 53/64* (2006.01)
- *B01D 53/74* (2006.01)
- *B01D 53/77* (2006.01)
- *B01J 20/00* (2006.01)
- *B01J 20/20* (2006.01)

(52) U.S. Cl. .......... 423/210; 423/243.01; 423/243.08; 422/168; 252/62.51 R; 252/62.56; 252/182.11; 252/182.32; 252/182.33; 502/400; 502/416; 502/417; 502/423; 95/134; 95/137

(58) Field of Classification Search ........... 423/210, 423/243.01, 243.08; 422/168; 252/62.51 R, 252/62.56, 182.11, 182.32, 182.33; 502/400, 502/416, 417, 423; 95/134, 137
See application file for complete search history.

(56) References Cited

U.S. PATENT DOCUMENTS

| | | | |
|---|---|---|---|
| 3,803,033 A | 4/1974 | Sutherland | |
| 4,284,511 A | 8/1981 | Weitzen et al. | |
| 4,889,698 A | 12/1989 | Moller et al. | |
| 5,811,066 A * | 9/1998 | Winkler et al. | 423/210 |
| 6,090,355 A * | 7/2000 | Winkler et al. | 423/210 |
| 6,953,494 B2 * | 10/2005 | Nelson, Jr. | 95/134 |
| 7,037,474 B2 | 5/2006 | Nolan et al. | |
| 7,407,602 B2 * | 8/2008 | Hurley | 252/182.11 |
| 2002/0124725 A1 * | 9/2002 | Chang et al. | 95/107 |
| 2003/0091490 A1 * | 5/2003 | Nolan et al. | 423/210 |
| 2004/0147397 A1 * | 7/2004 | Miller et al. | 502/406 |
| 2005/0093189 A1 | 5/2005 | Vo | |
| 2005/0150835 A1 | 7/2005 | Vo | |
| 2005/0155934 A1 | 7/2005 | Vo et al. | |
| 2006/0051270 A1 * | 3/2006 | Brunette | 423/210 |
| 2006/0057044 A1 * | 3/2006 | Chang et al. | 423/210 |
| 2006/0076229 A1 * | 4/2006 | Mazyck | 204/157.3 |

OTHER PUBLICATIONS

Marshall, Jessica, USG Corp., et al., "Fate of Mercury in Synthetic Gypsum Used for Wallboard Production, Topical Report, Task 2 Wallboard Plant Test Results," Aug. 2005.

\* cited by examiner

*Primary Examiner*—Timothy C Vanoy
(74) *Attorney, Agent, or Firm*—Brian M. Dingman; Mirick, O'Connell, DeMallie & Lougee, LLP (57) ABSTRACT

A process, system and sorbent for removal of mercury from a combustion exhaust gas stream in a combustion exhaust gas purification scheme that includes a combustion exhaust scrubber system that uses an aqueous liquid to remove acid gases from the combustion exhaust gas. A powdered mercury sorbent is used. The sorbent is introduced into the aqueous scrubber liquid in the scrubber system. After introduction of the mercury sorbent into the scrubber liquid, at least some of the mercury sorbent is separated from the scrubber liquid.

29 Claims, 2 Drawing Sheets

SYSTEM AND METHOD FOR SEQUESTRATION AND SEPARATION OF MERCURY IN COMBUSTION EXHAUST GAS AQUEOUS SCRUBBER SYSTEMS

CROSS REFERENCE TO RELATED APPLICATION

This application claims priority of Provisional Patent Application Ser. No. 60/860,891, filed on Nov. 24, 2006, the entire disclosure of which is incorporated herein by reference.

FIELD OF THE INVENTION

The present invention relates to the removal of mercury from the flue gases generated during the combustion of fossil fuels such as coal, or solid wastes.

BACKGROUND OF THE INVENTION

In recent years, research into the area of emissions from coal-fired utility boilers, cement plants, mineral ore processing, steel-making, gypsum wallboard production and waste-to-energy plants has shown that a large fraction of the input mercury (present as trace species in the feed materials) is emitted in the exhaust gases. Unlike most other metals, a large portion of the mercury volatilized into the vapor phase during high temperature processing does not condense onto particulates at the lower temperatures typically present in pollution control devices such as electrostatic precipitators and fabric filters. Therefore, it cannot be collected and disposed of along with particulate ash like the other metals. To complicate matters, mercury can exist in its oxidized ($Hg^{2+}$) form, principally as mercuric chloride, ($HgCl_2$), or in its elemental ($Hg^0$) form as vaporous metallic mercury. The relative amount of each species appears to depend on several factors such as fuel type, plant operating conditions, the type of particulate collector installed, and various other factors.

In addition to particulate removal, several industrial processes also include scrubbers for removal of acid gases such as HCl and sulfur dioxide. HCL is typically removed by dissolution in water. The resulting liquor is then neutralized with a substance such as lime, and the solids are disposed of. One of the methods to remove sulfur dioxide is to employ a wet flue gas desulfurization (FGD) scrubber, wherein the flue gas containing sulfur dioxide is contacted with a spray of water droplets containing an alkaline component such as limestone, lime, dolomite, magnesium compounds or sodium compounds. In the scrubber, the alkaline component, such as limestone ($CaCO_3$), reacts with the sulfur dioxide ($SO_2$) to form a neutral compound such as gypsum ($CaSO_4.2H_2O$). Oxidized mercury (mainly mercuric chloride) present in the flue gas, which is highly water soluble, was expected to be captured with very high efficiency, while elemental mercury in the flue gas, which has a very low solubility in water, was expected to be captured with a very low efficiency. However, it has been determined that the elemental mercury has a negative capture efficiency, suggesting that a portion of the incoming oxidized mercury is reduced in the FGD system, and re-emitted as elemental mercury in the exhaust gases.

Field measurements carried out at several full-scale units demonstrate that elemental mercury concentrations do indeed increase across the wet FGD system for all cases (see Table 1), indicating re-emission of mercury across the FGD vessel.

TABLE 1

Elemental Mercury Concentrations across Wet FGD Scrubbers
(Miller et al. August 2006)

| Site | Year Sampled | FGD Inlet $Hg^0$ Conc. µg/Nm³ | FGD Outlet $Hg^0$ Conc. µg/Nm³ | $Hg^0$ Increase, µg/Nm³ | Total Hg Removal % | Hg Removal if no Re-emission Had Occurred % |
|---|---|---|---|---|---|---|
| With upstream Selective Catalytic Reduction (SCR) System | | | | | | |
| S2 | 2001 | 0.4 | 0.9 | 0.5 | 89 | 95 |
| S2 | 2002 | 0.3 | 1.3 | 1.0 | 84 | 96 |
| S4 | 2001 | 0.5 | 0.8 | 0.3 | 90 | 94 |
| S4 | 2002 | 1.0 | 1.3 | 0.3 | 91 | 93 |
| S5 | 2002 | 0.7 | 1.0 | 0.3 | 91 | 93 |
| Without SCR | | | | | | |
| S2 | 2001 | 3.4 | 5.0 | 1.6 | 51 | 67 |
| S4 | 2001 | 5.6 | 7.1 | 1.5 | 46 | 57 |
| S4 | 2002 | 5.7 | 8.0 | 2.3 | 44 | 60 |
| S5 | 2002 | 4.7 | 6.1 | 1.4 | 51 | 62 |

As the proportion of coal-fired power plants that will be equipped with wet FGD systems increases, correspondingly, the amount of FGD by-product solids (mainly gypsum) from these scrubbers also increases; it has been projected that FGD gypsum production will increase from 31 million tons in 2004 to 86 million tons by 2020. Continued regulatory characterization of FGD by-products as non-hazardous is a critical factor for its marketability for beneficial end-use, such as gypsum wallboard production, as well as for disposal. This means that the amount of mercury in FGD solids must be minimized, and any remaining mercury in the FGD solids must be rendered stable.

Nolan et al. (U.S. Pat. No. 7,037,474) describe the addition of aqueous sulfide species to the wet FGD scrubber solution to precipitate the soluble mercury species as a mercury sulfide precipitate. One of the disadvantages of this approach is that the aqueous sulfide species reacts with the scrubber liquids to form hydrogen sulfide ($H_2S$) gas, creating objectionable $H_2S$ emissions, and objectionable odor. Another disadvantage is that a portion of the mercury sulfide that is precipitated reports to the gypsum phase, thus making the mercury available for leaching or thermal desorption when the gypsum is subsequently disposed or used.

Researchers have also tested an organo-sulfide compound, such as Degussa Corporation's TMT-15 (tri-mercapto-s-triazine, tri-sodium salt), to prevent re-emission of elemental mercury. TMT-15 has been used to prevent mercury re-emissions from wet FGD systems on municipal waste incinerators. Full-scale testing of TMT-15 at two coal-fired power plants showed only limited effectiveness, and in some cases, increased mercury re-emissions (Currie et al., Air Quality VI Conference, September 2007, Arlington, Va.).

US Patent Application publication 2005/0155934 describes a method and material for removing contaminants, such as mercury, from a flue gas stream using a magnetic removal adsorbent material that may be recovered and reused. The preferred adsorbent material comprises an iron-bearing activated carbon. The method introduces the mercury sorbent into the flue gas, and so does not address the issue of re-emission of mercury from a scrubber, nor separation of the mercury adsorbent from other solid components in the slurry.

US Patent application publication 2006/0076229 describes the use of magnetic powdered activated carbon to remove contaminants such as mercury from fluid streams including flue gases from a combustion plant. The method introduces the mercury sorbent into the flue gas, and so does not address the issue of re-emission of mercury from a scrubber, nor separation of the mercury adsorbent from other solid components in the slurry.

SUMMARY OF THE INVENTION

The invention relates to the field of combustion and flue gas cleanup methods, materials and apparatus and, in particular, to a new and useful method, material and apparatus for removing mercury from the flue gases generated during the combustion of fossil fuels such as coal, or from the combustion of solid wastes, for example.

The invention also relates to a method for decreasing emissions of vapor phase mercury species from a gas stream or mercury species already present in a liquid stream, and sequestering the mercury into a separate stream that can be treated further or disposed.

An objective of the invention is to minimize the re-emission of mercury from wet combustion gas scrubbers. These include scrubbers for acid gases such as HCl and sulfur dioxide. In one embodiment, the invention applies to wet flue gas desulfurization (FGD) scrubbers. Another objective of the invention is to selectively direct the mercury captured in the wet scrubber into a phase that can be separated from the bulk of the scrubber's reaction product solids (typically, gypsum), and to render any mercury that cannot be separated from the reaction product solids thermally stable and non-leachable.

The invention features a system and method for sequestering and removing mercury from combustion exhaust gases. The invention involves a powdered sorbent that can capture mercury from a combustion exhaust gas aqueous scrubber solution. An example is a sorbent composed of ultra-fine, magnetic, sulfur-impregnated activated carbon particles. The invention also involves the addition of mercury sorbent particles to the recirculating scrubber liquor to capture mercury from the solution, and the separation of the mercury-laden sorbent particles from both the scrubber solution and the reaction product (e.g., gypsum solids). Separation can be accomplished using magnetic-based separation devices such as permanent magnetic flocculators or wet high intensity magnetic separators. Separation can be further accomplished via the recovery of the larger (mercury-free) gypsum crystals in hydrocyclones; the ultra-fine nature of the sorbent particles inhibits their association with and enables separation from the larger gypsum crystals in hydrocyclones where gypsum is recovered.

The invention provides a method for minimizing the re-emission of mercury from wet flue gas desulfurization devices and other wet acid gas treatment devices such as aqueous scrubbers for HCl. The method maximizes the capture in the scrubber of soluble oxidized mercury species present in the flue gas, and minimizes the re-emission of the mercury into the flue gas. Also, the captured mercury is relatively thermally stable and non-leachable, an important characteristic for disposal or re-use of the reaction product.

This invention features a process for removal of mercury from a combustion exhaust gas stream in a combustion exhaust gas purification scheme that includes a combustion exhaust scrubber system that uses an aqueous liquid to remove acid gases from the combustion exhaust gas, the process comprising providing a powdered mercury sorbent, introducing the powdered mercury sorbent into the aqueous liquid in the scrubber system, and after introduction of the mercury sorbent into the aqueous liquid, separating at least some of the mercury sorbent from the aqueous liquid.

The aqueous liquid may comprise an alkaline substance such as limestone, and the reaction product may be gypsum. The mercury sorbent may comprise carbonaceous material, such as activated carbon. The activated carbon can be modified with a sulfur species, or with halogen or a halogen-containing substance, for example. The activated carbon may be treated with a material selected from the group consisting of chlorine, bromine, iodine, fluorine, metal halides and ammonium halides, and then the treated activated carbon is preferably heated to fix the halogen on the carbon. The scrubber system typically includes a scrubbing liquor recirculation loop, and the mercury sorbent is preferably introduced into this scrubbing liquor recirculation loop. The mercury sorbent is typically mixed with a powder dispersing agent.

In one embodiment, at least some of the mercury sorbent is magnetic. The magnetic mercury sorbent may comprise a magnetic component, for example an iron species. The mercury sorbent can be at least partially removed from the aqueous liquid by magnetic separation. Such magnetic separation may be accomplished with a high intensity magnetic separator or a permanent magnetic flocculator.

The combustion exhaust gas purification scheme typically comprises separation of at least some of the reaction product of the alkaline substance and the acid gases from the aqueous liquid. Preferably, the magnetic separation of the mercury sorbent from the aqueous liquid takes place before the separation of at least some of the reaction product of the alkaline substance and the acid gases from the aqueous liquid. At least most of the mercury sorb ent may have a particle size that is smaller than that of at least some of the reaction product, and the reaction product is in this case preferably at least partially removed from the aqueous liquid based at least in part on particle size. At least most of the mercury sorbent may be less dense than at least some of the reaction product, and the reaction product is in this case preferably at least partially removed from the aqueous liquid also based at least in part on density. Such partial removal may be accomplished at least in part with an inertial separation device, such as a hydrocyclone.

This invention also features a system for removal of mercury from a combustion exhaust gas stream in a combustion exhaust gas purification scheme that includes a scrubber system that uses an aqueous liquid to remove acid gases from the combustion exhaust gas. The system includes a powdered mercury sorbent storage system, equipment for introducing the powdered mercury sorbent into the aqueous liquid in the scrubber system, and equipment for separating at least some of the mercury sorbent from the aqueous liquid after introduction of the mercury sorbent into the aqueous liquid.

Further featured in the invention is a mercury sorbent that can be used to remove solubilized mercury from an aqueous combustion exhaust gas stream scrubber liquor, comprising a powdered solid sorbent with a particle size such that about 90% of the particles are smaller than about 45 microns, and a magnetic substance coupled to the solid sorbent. The powdered solid sorbent may be activated carbon. The activated carbon more preferably has a particle size such that about 90% of the particles are smaller than about 25 microns, and most preferably a particle size such that about 90% of the particles are smaller than about 15 microns.

BRIEF DESCRIPTION OF THE DRAWINGS

Various other objects, features and advantages of the present invention will become fully appreciated as the invention becomes better understood when considered in conjunction with the accompanying drawings, in which.

DETAILED DESCRIPTION OF THE INVENTION

The invention features a system and method for sequestration and separation of mercury in combustion exhaust gas aqueous scrubber systems. The invention applies to the treatment of flue gas containing mercury (both elemental and water-soluble oxidized mercury compounds) and sulfur dioxide or other acid gas components such as HCl. In the preferred embodiment, treatment occurs in a wet flue gas desulfurization scrubber or a wet acid gas scrubber; such scrubbers are primarily used to remove sulfur dioxide or other acid gas components such as HCl. Alkaline material such as limestone, lime, magnesium-enhanced lime, dolomite, sodium compounds or magnesium compounds, for example, in the scrubbing liquor can be used to treat the acid gas.

Gas phase elemental mercury)($Hg^0$) is water insoluble and will pass through the scrubber without being affected, while the water soluble gas phase oxidized mercury species (e.g. $HgCl_2$) will be absorbed into the aqueous scrubber solution and will leave the scrubber via one of the outlet liquid or solid streams. Also, oxidized mercury species absorbed in the scrubber solution can be reduced to elemental mercury, which would then be emitted as a gas phase component with the flue gas. Such reemission is inhibited by the invention. The mercury sorbent used in the invention adsorbs the soluble mercury species from the aqueous phase, thus decreasing the concentration of the dissolved mercury. The reduced concentration of the dissolved mercury results in a decreased amount of mercury inventory available for reduction and its re-emission, and a greater driving force for additional soluble mercury absorption from the gas phase into the scrubber liquor.

The invention segregates the mercury captured from the scrubber solution into a separate phase, and so minimizes its reporting to the exiting streams of solid aqueous scrubber reaction products, other solids, or liquids (e.g. blow-down).

The invention uses a powdered mercury sorbent to capture mercury that is in an aqueous scrubber liquor. Several types of mercury sorbents may be used in the invention. One is activated carbon, which has been demonstrated to be an effective mercury sorbent material. The activated carbon may be enhanced for better mercury capture. Enhancement may be by halogen species. Halogen-enhanced activated carbon may be further enhanced with sulfur. Alternatively, the activated carbon can be enhanced with sulfur, and/or with iron. Other mercury sorbents that can be used with the invention include sulfur-impregnated or sulfur-exchanged clays, silicates, aluminosilicates, or zeolites. To assist in proper storage and delivery of the fine powdered sorbent, a powder dispersing agent such as lignin sulfonate, alkylbenzene sulfonic acid salts, alkyl naphthalene sulfonic acid salts and naphthalene sulfonic acid salts may be added to the sorbent.

Another aspect of the invention is the separation of the spent sorbent (sorbent/mercury particles) from the scrubbing liquor and the reaction product. Separation can be based on one or both of the particle size and particle density, and/or the magnetic properties of the sorbent. In the preferred embodiment, separation is accomplished based on all three of these properties.

Material size characteristics can be used to separate the spent sorbent from the reaction product. One example is by inertial separation, such as may be accomplished in a cyclone. The mercury sorbent has a particle size such that at least most of the sorbent is smaller than at least some of the scrubber reaction product. In a more general sense, when size is the main parameter controlled, the size of the sorbent particles is selected to be small enough such that it can be inertially separated from reaction product particles. Actually, in inertial separation both size and density affect the separation. Typically, the density of the activated carbon particles is lower than that of the reaction product (e.g., gypsum in a FGD scrubber). A lower density and a smaller size of spent sorbent particles should ensure that it is effectively separated from the reaction product particles in an inertial separation device such as a hydrocyclone.

As stated, separation can also (or alternatively) be based on the magnetic properties of the mercury sorbent. In the preferred embodiment, the sorbent is magnetic activated carbon. There are many means by which magnetic activated carbon can be created. One is by iron hydroxide precipitation into the pores of activated carbon particles to make the carbon particles magnetic. Another is through magnetite or iron impregnation into the activated carbon particles by mechanically grinding/milling particles of activated carbon and magnetite or iron to form a composite that is magnetic. Yet another is by mixing a magnetic material precursor and an activated carbon precursor and subjecting the combination to pyrolysis and steam activation to make a magnetic activated carbon.

The invention also contemplates mercury sorbents other than activated carbon. Magnetic (non-activated carbon) mercury sorbent can be created by iron hydroxide precipitation into the pores of the mercury sorbent particles to make the sorbent particles magnetic, or by magnetite or iron impregnation by mechanically grinding/milling sorbent particles and magnetite or iron to form a composite that is magnetic.

Sorbent Preparation

The preparation of the sorbent for use in the invention can be accomplished in at least the following manners.

Activated Carbon with Halogen Species

Activated carbon with halogen species can be obtained by mixing activated carbon particles with a solution of the halogen species. For example, soluble halogen compounds such as metal halides and ammonium halides may be used. To ensure that the halogen species are not re-dissolved in the scrubber solution when the activated carbon sorbent is added, the activated carbon particles with the solution of halogen species impregnated is first dried, then heated further to between 200 to 600° C. to bond the halogen to the carbon matrix. Alternately, a halogen such as chlorine, bromine, iodine or fluorine (in a liquid or gaseous form) may be directly contacted with the activated carbon, so that the activated carbon adsorbs the halogen. The combination when heated to between 200 to 600° C. will bond the halogen to the carbon matrix and make the halogen predominantly water-insoluble. Halogen-enhanced activated carbon may be further enhanced with sulfur, for example as discussed just below.

Activated Carbon with Sulfur

U.S. Pat. No. 3,194,629 (incorporated herein by reference) describes a method of preparing an activated carbon with sulfur that can be used in the invention. Sulfur is dissolved in carbon disulfide and mixed with the activated carbon. The mixture is then evaporated to dryness.

Non-Carbonaceous Mercury Sorbents

U.S. Pat. No. 4,474,896 (incorporated herein by reference) describes an example of an adsorbent composition that can be used in the invention. These adsorbents are preferably derived from a sulfide-forming species and a polysulfide-forming species by contacting a support material, preferably a crystalline aluminosilicate zeolite, with a solution containing at least one cation capable of forming an insoluble polysulfide, and contacting the cation-containing support with a sulfide-forming species and a polysulfide-forming species, such as an alkali metal trisulfide.

U.S. Pat. No. 7,288,499 (incorporated herein by reference) describes another adsorbent composition that can be used in the invention. This material consists of a silicate substrate material such as vermiculite, montmorillonite or allophane. Sorbent preparation is a multi-step process that includes the exchange of metals and addition of sulfide ions to the substrate material. The first step in the preparation of the sorbent is an ion exchange between the silicate substrate material and a solution containing one or more of a group of polyvalent metals including tin (both Sn(II) and Sn(IV)), iron (both Fe(II) and Fe(III)), titanium, manganese, zirconium and molybdenum, dissolved as salts, such as the sulfate, chloride or nitrate. When the ion exchange is complete, the silicate substrate material is separated from the solution and washed with water. In the second step, a liquid phase source of sulfide is contacted with the ion-exchanged silicate substrate. Sources of sulfur or sulfide for liquid-phase contacting include sodium sulfide, calcium polysulfide and the thiocarbonate ion. During this process, the exchanged polyvalent metal ions precipitate as an insoluble sulfide and become locked in place within the silicate lattice. The amended silicate is then separated from the solution and dried into a flowable powder. If needed, the spray-dried material is ground in an additional step to achieve the preferred particle size distribution.

Sorbent Sizing

The objective for sizing the mercury sorbent in the preferred embodiment is such that it can be inertially separated from the scrubber reaction product in a device such as a hydrocyclone. Activated carbon/mercury sorbent particles of the preferred size are obtained by grinding activated carbon/mercury sorbent particles to 90% smaller than 45 microns (325 mesh sieve), more preferably to 90% smaller than 25 microns (600 mesh sieve) and most preferably to 90% smaller than 15 microns. Grinding can be accomplished in a roller mill, jet mill, ball mill or an agitated media mill. A jet mill, ball mill or an agitated media mill is preferred for the smaller size range. Activated carbon true density is around 1.0 gm/cc, while gypsum particle true density is around 2.3 to 2.7 gm/cc.

Gypsum produced from typical wet flue gas desulfurization systems has a mean size around 40 to 50 microns. For example, the following reference indicates a gypsum size distribution of $d_{10}$=25 micron; $d_{50}$=45 micron and $d_{95}$=97 micron, where $d_x$ is the particle size and corresponds to x percent of particles being smaller than that size. (Reference: "Fate of Mercury in Synthetic Gypsum used in Wallboard Production" Topical Report, Task 2; U.S. Department of Energy Cooperative Agreement No. DE-FC26-04NT42080. See http://www.netl.doe.gov/technologies/coalpower/ewr/coal_utilization_byproducts/pdf/USGTask2TopRpt.pdf).

Preparation of Magnetic Sorbents

U.S. Pat. No. 3,803,033 (incorporated herein by reference) describes one method to prepare sorbents that are magnetic of the type that can be used in the invention. The magnetically susceptible iron-carbon complex is prepared by a process comprising the steps of: (a) forming a slurry by admixing powdered activated carbon, a ferrous salt solution and a sufficient amount of a base reagent to control the resulting slurry to a pH level of from about 6 to about 11, said slurry having a continuous phase comprising ferrous salt solution and the base reagent and a dispersed phase comprising powdered activated carbon, and (b) mixing the slurry of step (a) in the presence of air for a time and at a temperature sufficient to form a slurry having a continuous phase comprising a ferrous salt solution of reduced concentration and base reagent, and a dispersed phase comprising particles of the iron-carbon complex, said heating being continued until substantially all of the particles of the iron-carbon complex can be moved in response to application of a magnetic field. The iron-carbon complex can be separated from the slurry quickly by application of a magnetic field to the slurry to hold the particles, and decanting the liquid phase from the iron-complex particles. The complex can also be separated by filtration methods. The resultant iron-carbon complex particles are dried and stored for use as required. The carbon that can be employed in the iron-carbon complex includes all types of activated carbon in particulate form having particles ranging from about 200 angstroms up to about 200 microns in their greatest dimension. The term "activated" carbon means a porous carbon having adsorptive capacity and derived from organic substances of vegetable origin such as lignite, and wood pulp by-products, and animal or carbonaceous mineral origin. Any ferrous salt that can be precipitated by the addition of a base reagent to an aqueous solution of the ferrous salt can be employed to prepare the complex. Illustrative ferrous salts that can be employed include ferrous sulfate, ferrous chloride, ferrous acetate, ferrous bromide, ferrous nitrate, and the like. Illustrative base reagents that can be employed to adjust the pH of the slurry include sodium hydroxide, potassium hydroxide, ammonium hydroxide, ammonium carbonate, calcium oxide, and the like. Adjustment of the pH of the slurry in preparing the iron-carbon complex is important to insure precipitation of the ferrous hydroxide and to prepare an iron-carbon complex that exhibits sufficient magnetic susceptibility to be attracted by magnetic forces. Thus, it has generally been found that iron-carbon complexes prepared in slurries in which the pH is less than about 6, or greater than about 11, have very poor magnetic properties. It is generally desirable to maintain the slurry at a pH of between about 6 and 11, and preferably between about 7 to about 9 to achieve an iron-carbon complex having optimum magnetic susceptibility.

In preparing the iron-carbon complex it is desirable to heat the slurry of ingredients above ambient temperature (21° C.) to accelerate oxidation of ferrous hydroxide to iron oxide. It is preferable to heat the slurry to about 100° C. Heating of the slurry at about 100° C. under air pressure is desirable since this further speeds the oxidation process.

It is generally preferred to prepare an iron-carbon complex comprising at least about 10 percent by weight of iron oxide to permit ready removal of the complex when the complex is subjected to an applied magnetic force.

The above method can also be used to prepare non-carbonaceous magnetic material, for example, with a sulfur-impregnated silicate sorbent.

Another method to prepare magnetic sorbents that can be used in the invention is to incorporate magnetically susceptible materials such as magnetite or iron into an activated carbon by mechanically grinding or milling magnetite/iron powder with the powdered activated carbon in a ball mill or an agitated media mill. Both the desired size reduction and magnetic property incorporation can be accomplished simultaneously in this method. The above method can also be used to prepare non-carbonaceous magnetic material, for example by using a sulfur-impregnated silicate sorbent.

A third method to make an activated carbon material with magnetic properties that can be used in the invention has been described in US Patent Application 2004/0147397 (incorporated herein by reference). In this method, a solution of a magnetic material precursor and a carbon precursor are intimately mixed, dried, pyrolyzed and activated with steam to form a magnetic activated carbon suitable for adsorption. In the present invention, such a material can be used and may be further modified by adding a sulfur-containing compound to the activated carbon-magnetic material precursor mixture to form a magnetic sulfurized activated carbon.

The different moieties present in the adsorbents manufactured in the above manner, iron, sulfur and carbon, all have a strong affinity for mercury. Separating the mercury-laden magnetic activated carbon particles from the scrubber liquor produces a gypsum product that will be practically mercury-free. Mercury captured by the mercury sorbent is also expected to be stable. The mercury-sulfur complex is water insoluble. The chemisorbed mercury is also thermally stable.

Sorbent Separation from Scrubber Streams

Separation of the sorbent particles from the aqueous scrubber stream in accordance with the invention can be accomplished based on particle size, particle density, and/or other properties of the sorbent particles that differentiate it from the scrubbing liquor and the scrubber liquor/acid gas reaction product(s). In the preferred embodiment, the sorbent particles are magnetic and the separation is accomplished at least in part by a magnetic separation device, such as a high intensity magnetic separator or a permanent magnetic flocculator. For example, Eriez Magnetics of Erie, Pa. manufactures and markets such devices. Such high throughput devices are currently employed to separate very fine magnetic particles from ore and heavy media slurries in mineral processing and coal mining operations, and can be effectively used for treating the scrubber solutions and separating the magnetic activated carbon particles that have captured the mercury. In addition to the magnetic separation of the sorbent particle, the ultra-fine nature of the sorbent particles also serves to prevent their association with the larger gypsum crystals and in the gypsum product from wet FGD scrubbers.

Figure 1:
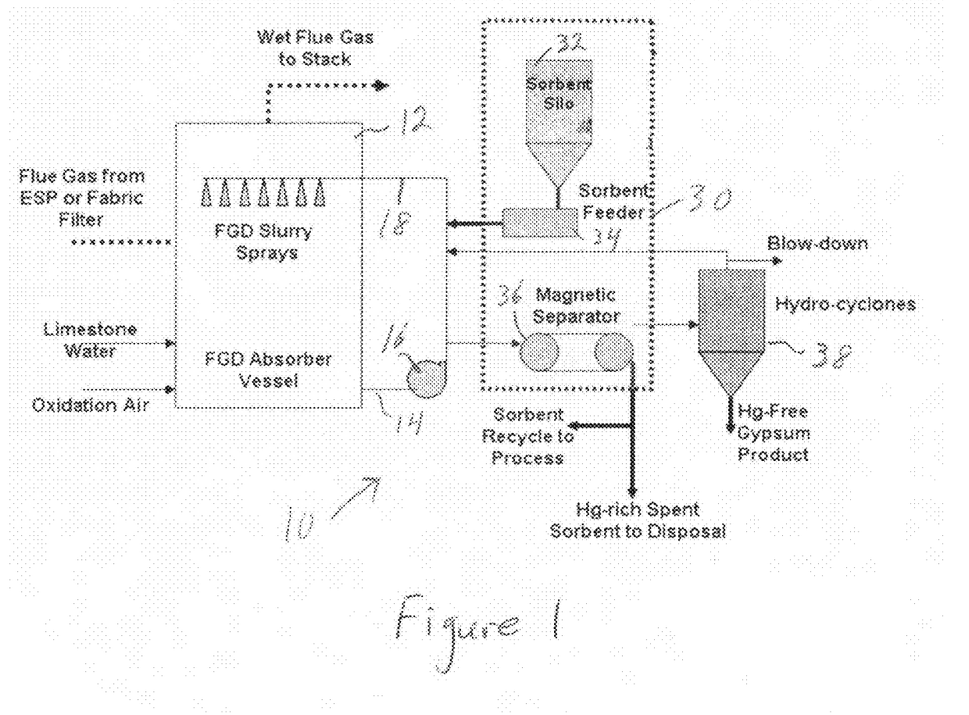
FIG. 1 schematically depicts a system of the invention that can also be used for the method of the invention.

FIG. 1 schematically depicts a preferred system of the invention that can also be used to accomplish the preferred method of the invention. System 10 includes flue gas desulfurization (FGD) vessel 12 in which an aqueous scrubbing liquor is sprayed into the flue gas stream. In this example the scrubbing liquor is a limestone/water slurry. The scrubbing liquor is removed from the bottom of vessel 12 through outlet 14, and recirculated through line 18 by pump 16. Some of the recirculated liquor is diverted to system 30 that is added to the normal FGD system, per the invention. System 30 comprises silo 32 for storing the particulate mercury sorbent used in the invention (preferably magnetic activated carbon that may also include sulfur), sorbent feeder 34 that takes sorbent from silo 32 and injects it at the proper rate into line 18, and magnetic separator 36. Magnetic separator 36 is fed with the diverted scrubbing liquor, and removes at least some of the magnetic sorbent particles from the stream; a portion of the separated magnetic sorbents are sent to disposal, while the remainder is returned to the FGD process (after the hydro-cyclone). The liquor is returned to vessel 12 via hydro-cyclone 38. The remaining solids after passing through magnetic separator 36 (predominantly wet FGD reaction product solids, limestone, and a small portion of the mercury sorbent) and liquor are sent to hydrocyclone 38, which separates the larger solids from the smaller solids and the liquid due to the different inertial properties of the sorbent and the gypsum particles (particularly the larger gypsum particles). The stream of smaller solids (which will include small limestone particles, the smaller gypsum particles, and remaining activated carbon particles) and liquid is returned to vessel 12 (minus a normal blow-down stream), while the reaction product is sent to disposal, or to a more beneficial use: in this example, the separated reaction product is larger gypsum crystals/particles, which can be put to beneficial use, for example in the manufacture of wallboard.

A small amount of mercury-laden sorbent particles will typically end up in the gypsum or other scrubber reaction product waste solids. In the case of the use of the invention to sequester and secure mercury in the neutralizing reaction product in water-based acid gas scrubber systems, the spent mercury sorbent may not be removed from the waste stream before waste concentration (such as by a cyclone or other water-removal equipment), meaning that all of the adsorbed mercury that does not remain with the separated aqueous liquid will be present in the waste stream. However, as the mercury has been adsorbed onto the powdered mercury sorbent in all cases, through the use of the invention the mercury is more thermally stable and non-leachable than it would otherwise be, making the waste solids more commercially useful, or easier to dispose of. Also, the waste solids can be further treated to remove at least some of the remaining mercury-laden sorbent. For example, when magnetic sorbent particles are used, the damp or dry waste solids can be treated with a magnetic separator to decrease the amount of mercury in the waste solids stream.

Figure 2:
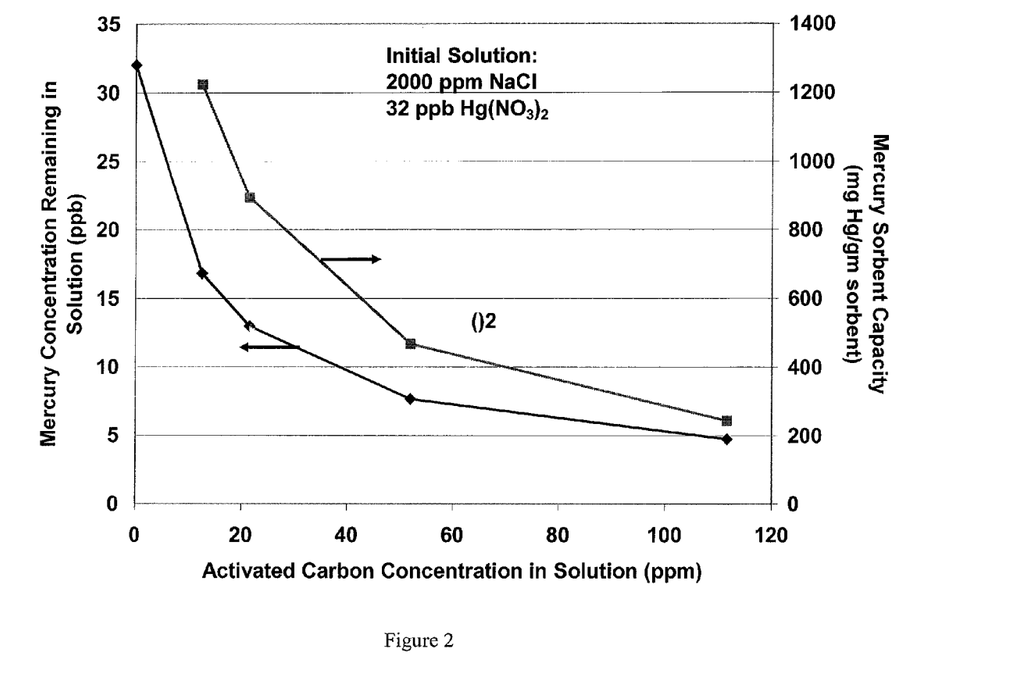
FIG. 2 shows the results of a batch study that was performed to model a flue gas desulfurization flow system in order to ascertain general adsorption characteristics of mercury contaminant in the FGD scrubber solution.

A batch study was performed to model a flue gas desulfurization flow system in order to ascertain general adsorption characteristics of mercury contaminant in the scrubber solution. The results are shown in FIG. 2. A bituminous-based activated carbon sorbent was used in these experiments. An aqueous solution was prepared with 2000 ppm NaCl and 32 ppb Hg as mercury nitrate. Activated carbon sorbent was added to the solution in concentrations ranging from 12.5 ppm to 111.7 ppm. Exposure times were limited to 20 minutes, including centrifugation. The decanted solution was analyzed for remaining mercury. FIG. 2 provides the concentration of the remaining mercury in the solution and the corresponding mercury loading in the sorbent. Mercury concentrations can be reduced close to seven-fold by the addition of approximately 100 ppm of activated carbon to the solution.

With respect to the above description then, it is to be realized that the optimum relationships for the elements of the invention, to include variations in size, materials, shape, form, function and manner of operation, assembly and use, are deemed apparent to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will occur to those skilled in the art, it is not desired to limit the invention to the exact construction and operation shown and described, and accordingly, all suitable modifications and equivalents may be resorted to, falling within the scope of the invention.

What is claimed is:

1. A process for removal of mercury from a combustion exhaust gas stream in a combustion exhaust gas purification scheme that includes a combustion exhaust scrubber system that uses an aqueous liquid to remove acid gases from the combustion exhaust gas, the process comprising:
   providing a powdered mercury sorbent comprising activated carbon that has been modified with a sulfur species;
   introducing the powdered mercury sorbent into the aqueous liquid in the scrubber system; and
   after introduction of the mercury sorbent into the aqueous liquid, separating at least some of the mercury sorbent and at least some of the aqueous liquid.

2. The process of claim 1 in which the aqueous liquid comprises a calcium-containing alkaline material selected from the group consisting of limestone, lime, magnesium-enhanced lime and dolomite.

3. The process of claim 1 in which the aqueous liquid comprises an alkaline substance that reacts with the acid gases to create a reaction product, and the combustion exhaust gas purification scheme further comprises separation of at least some of the reaction product from the aqueous liquid, and in which the reaction product is at least partially removed from the aqueous liquid based at least in part on its particle size and density.

4. The process of claim 3 in which the reaction product comprises gypsum, and at least most of the mercury sorbent has a particle size that is smaller than that of at least some of the gypsum, and at least most of the mercury sorbent is less dense than at least some of the gypsum.

5. The process of claim 4 in which the at least partial removal is accomplished at least in part with an inertial separation device.

6. The process of claim 5 further comprising removing mercury sorbent from the reaction product that was removed from the aqueous liquid by the inertial separation device.

7. The process of claim 1 in which the scrubber system comprises an aqueous liquid recirculation loop, and the mercury sorbent is introduced into the aqueous liquid recirculation loop.

8. A process for removal of mercury from a combustion exhaust gas stream in a combustion exhaust gas purification scheme that includes a combustion exhaust scrubber system that uses an aqueous liquid to remove acid gases from the combustion exhaust gas, the process comprising:
   providing a powdered mercury sorbent in which at least some of the mercury sorbent is magnetic;
   introducing the powdered mercury sorbent into the aqueous liquid in the scrubber system; and
   after introduction of the mercury sorbent into the aqueous liquid, separating at least some of the mercury sorbent and at least some of the aqueous liquid.

9. The process of claim 8 in which the magnetic mercury sorbent comprises a magnetic component.

10. The process of claim 9 in which the magnetic component comprises an iron species.

11. The process of claim 10 in which the powdered mercury sorbent comprises activated carbon that has been modified with a sulfur species.

12. The process of claim 8 in which mercury sorbent is at least partially removed from the aqueous liquid by magnetic separation.

13. The process of claim 12 in which magnetic separation is accomplished with a high intensity magnetic separator or a permanent magnetic flocculator.

14. The process of claim 12 in which the aqueous liquid comprises an alkaline substance that reacts with the acid gases to create a reaction product, and the combustion exhaust gas purification scheme further comprises separation of at least some of the reaction product from the aqueous liquid, and the magnetic separation of the mercury sorbent from the aqueous liquid takes place before the separation of at least some of the reaction product from the aqueous liquid.

15. The process of claim 14 in which at least most of the mercury sorbent has a particle size that is smaller than that of at least some of the reaction product, and the reaction product is at least partially removed from the aqueous liquid based at least in part on particle size.

16. The process of claim 13 in which the activated carbon has been modified with halogen or a halogen-containing substance.

17. The process of claim 16 in which the activated carbon is treated with a material selected from the group of materials consisting of chlorine, bromine, iodine, fluorine, metal halides and ammonium halides, and then the treated activated carbon is heated to fix the halogen on the carbon.

18. The process of claim 15 in which at least most of the mercury sorbent is less dense than at least some of the reaction product, and the reaction product is at least partially removed from the aqueous liquid also based at least in part on density.

19. The process of claim 18 in which the at least partial removal is accomplished at least in part with an inertial separation device.

20. The process of claim 19 in which the reaction product comprises gypsum.

21. A process for removal of mercury from a combustion exhaust gas stream in a combustion exhaust gas purification scheme that includes a combustion exhaust scrubber system that uses an aqueous liquid to remove acid gases from the combustion exhaust gas, the process comprising:
   providing a powdered mercury sorbent in which the mercury sorbent is mixed with a powder dispersing agent
   introducing the powdered mercury sorbent into the aqueous liquid in the scrubber system; and
   after introduction of the mercury sorbent into the aqueous liquid, separating at least some of the mercury sorbent and at least some of the aqueous liquid.

22. The process of claim 21 in which the powdered mercury sorbent comprises activated carbon that has been modified with a sulfur species.

23. The process of claim 21 in which the mercury sorbent comprises activated carbon that has been modified with halogen or a halogen-containing substance.

24. The process of claim 21 in which at least some of the mercury sorbent is magnetic.

25. A system for removal of mercury from a flue gas stream, comprising:
- a wet flue gas desulfurization (FGD) scrubber system that uses an aqueous scrubbing liquor containing an alkaline substance that is sprayed into an absorber vessel to remove sulfur oxides from the flue gas through reaction between the alkaline substance and the sulfur oxides, the scrubber system comprising a scrubbing liquor recirculation loop that returns scrubbing liquor from the bottom portion of the absorber vessel to be sprayed in the vessel;
- powdered, magnetic mercury sorbent;
- a mercury sorbent storage system;
- a feeder for introducing the mercury sorbent into the scrubbing liquor recirculation loop;
- equipment for withdrawing a portion of the scrubbing liquor from the recirculation loop as a spent sorbent and reaction product stream;
- a magnetic separator that receives the spent stream and removes at least some of the mercury sorbent from the spent stream; and
- an inertial separation device downstream of the magnetic separator for removing at least some of the reaction product from the spent stream.

26. A mercury sorbent that can be used to remove solubilized mercury from an aqueous combustion exhaust gas stream scrubber liquor, comprising:
- a powdered solid sorbent with a particle size such that about 90% of the particles are smaller than about 25 microns, in which the powdered solid sorbent comprises activated carbon that has been modified with at least a sulfur species; and
- a magnetic substance coupled to the solid sorbent.

27. The mercury sorbent of claim 26 in which the activated carbon has a particle size such that about 90% of the particles are smaller than about 15 microns.

28. The mercury sorbent of claim 26 in which the activated carbon is treated with a material selected from the group of materials consisting of chlorine, bromine, iodine, fluorine, metal halides and ammonium halides, and then the treated activated carbon is heated to fix the halogen on the carbon.

29. The mercury sorbent of claim 26 in which the activated carbon has been modified with a sulfur species, and with halogen or a halogen-containing substance.

* * * * *

UNITED STATES PATENT AND TRADEMARK OFFICE
CERTIFICATE OF CORRECTION

PATENT NO.           : 7,722,843 B1                                                                 Page 1 of 1
APPLICATION NO.  : 11/944705
DATED                    : May 25, 2010
INVENTOR(S)          : Srivats Srinivasachar It is certified that error appears in the above-identified patent and that said Letters Patent is hereby corrected as shown below:

1. Claim 16 appearing in Column 12, Lines 30-32, should be corrected as follows:

16. The process of claim "13"--1-- in which the activated carbon has been modified with halogen or a halogen-containing substance.

2. Claim 21 appearing in Column 12, lines 53-54, should be corrected as follows:

providing a powdered mercury sorbent in which the mercury sorbent is mixed with a powder dispersing agent--;--

Signed and Sealed this

Third Day of August, 2010

David J. Kappos
*Director of the United States Patent and Trademark Office*